(12) United States Patent  
Lin (10) Patent No.: US 6,549,656 B1  
(45) Date of Patent: Apr. 15, 2003

(54) FUZZY IMAGE SEGMENTATION (75) Inventor: Ying-wei Lin, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/626,433

(22) Filed: Apr. 2, 1996

Related U.S. Application Data (63) Continuation of application No. 08/332,612, filed on Oct. 31, 1994, now abandoned, which is a continuation of application No. 08/158,589, filed on Nov. 29, 1993, now abandoned.

(51) Int. Cl.[7] .................................................. G06K 9/62
(52) U.S. Cl. ...................................... 382/173; 382/228
(58) Field of Search .................................. 382/173, 176, 382/155, 159, 224, 228; 345/113, 115; 358/462, 467; 395/61, 1; 706/1, 900, 902

(56) References Cited

U.S. PATENT DOCUMENTS

| | | | |
|---|---|---|---|
| 3,294,896 A | | 12/1966 | Young, Jr. |
| 4,068,266 A | | 1/1978 | Liao .............................. 358/280 |
| 4,194,221 A | | 3/1980 | Stoffel ........................... 358/283 |
| 4,509,195 A | | 4/1985 | Nadler ........................... 382/51 |
| 4,547,811 A | | 10/1985 | Ochi et al. ...................... 358/280 |
| 4,556,918 A | | 12/1985 | Yamazaki et al. ............. 358/283 |
| 4,559,563 A | | 12/1985 | Joiner, Jr. ...................... 358/260 |
| 4,578,714 A | | 3/1986 | Sugiura et al. ................. 358/283 |
| 4,730,221 A | | 3/1988 | Roetling ........................ 358/298 |
| 4,736,253 A | | 4/1988 | Shida ............................ 358/283 |
| 4,811,115 A | | 3/1989 | Lin et al. ....................... 358/283 |
| 5,018,024 A | * | 5/1991 | Tanioka ......................... 382/176 |
| 5,099,331 A | * | 3/1992 | Truong .......................... 345/113 |
| 5,109,436 A | * | 4/1992 | Machida et al. ................ 382/9 |
| 5,202,933 A | | 4/1993 | Bloomberg ..................... 382/9 |
| 5,231,677 A | * | 7/1993 | Mita et al. ..................... 358/462 |
| 5,245,445 A | * | 9/1993 | Fujisawa ........................ 358/462 |
| 5,260,695 A | * | 11/1993 | Gengler et al. ................ 345/115 |
| 5,293,430 A | * | 3/1994 | Shiau et al. .................... 382/42 |

FOREIGN PATENT DOCUMENTS

EP           0521662        6/1992    ............ H04N/1/40

* cited by examiner

*Primary Examiner*—Jon Chang  
(74) *Attorney, Agent, or Firm*—Thomas B. Zell; Duane C. Basch; Michael J. Nickerson (57) ABSTRACT

A digital image processing system for automatically segmenting a set of input image signals into a combination of predetermined classes of imagery, the set of input image signals forming part of a video image generated by an image input terminal. The system includes a classification circuit that receives the set of input image signals and classifies them as a ratio of the predetermined classes of imagery. A plurality of image processing circuits also receives the set of input image signals, each of which is adapted to process a unique class of imagery selected from the predetermined classes of imagery to generate a set of output image signals for that predetermined class of imagery. Finally, a mixing circuit combines each of the sets of output image signals determined by the plurality of image processing circuits in accordance with the ratio determined by the classification circuit to form a single set of output image signals, the mixing circuit minimizing the generation of artifacts formed in the single set of output image signals by providing a gradual transition between each of the predetermined class of imagery.

24 Claims, 4 Drawing Sheets

FUZZY IMAGE SEGMENTATION

This is a continuation, of application Ser. No. 08/332,612, filed Oct. 31, 1994 now abandoned, which is a continuation of application Ser. No. 08/158,589, filed Nov. 29,1993 now abandoned.

The present invention relates generally to a system for processing document images to identify image types therein, and more particularly to an improved method of automatically segmenting a document image by classifying each type of imagery with some probability.

INCORPORATION BY REFERENCE

U.S. Pat. No. 4,194,221 to Stoffel, U.S. Pat. No. 4,811,115 to Lin et al. and U.S. patent application Ser. No. 08/004,479 by Shiau et al. now U.S. Pat. No. 5,293,430 (published at EP-A2 0 521 662 on Jan. 7, 1993) are herein specifically incorporated by reference for their teachings regarding image segmentation.

BACKGROUND OF THE INVENTION

In the reproduction of copies of an original document from video image data created, for example, by electronic raster input scanning from an original document, one is faced with the limited resolution capabilities of the reproducing system and the fact that output devices are mostly binary or require compression to binary for storage efficiency. This is particularly evident when attempting to reproduce halftones, lines and continuous tone images. Of course, an image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of multiple image types, including high frequency halftones, low frequency halftones, continuous tones, line copy, error diffused images, etc. or a combination, in some unknown degree, of some or all of the above or additional image types. In the face of these possibilities, optimizing the image processing system for one image type in an effort to offset the limitations in the resolution and the depth capability of the reproducing apparatus used (e.g. a device resolution of K pixels per unit length by L pixels per unit length (K×L) and each pixel defined at a depth b representing one of b optical densities), may not be possible, requiring a compromise choice which may not produce acceptable results. Thus, for example, where one optimizes the system for low frequency halftones, it is often at the expense of degraded reproduction of high frequency halftones, or of line copy, and vice versa.

Automatic segmentation serves as a tool to identify different image types or imagery, and identify the correct processing of such image types. In U.S. Pat. No. 4,194,221 to Stoffel, the problem of image segmentation was addressed by applying a function instructing the image processing system as to the type of image data present and particularly, an auto correlation function to the stream of pixel data, to determine the existence of halftone image data. Such a function is expressed as:

$$A(n) = \sum_{t=0}^{t=Last} [p(t) \times p(t+n)] \quad (1)$$

where n=the bit or pixel number;
p=the pixel voltage value; and
t=the pixel position in the data stream.

Stoffel describes a method of processing automatically a stream of image pixels representing unknown combinations of high and low frequency halftones, continuous tones, and/or lines to provide binary level output pixels representative of the image. The described function is applied to the stream of image pixels and, for the portions of the stream that contained high frequency halftone image data, notes a large number of closely spaced peaks in the resultant signal.

In U.S. Pat. No. 4,811,115 to Lin et al, the auto correlation function is calculated for the stream of halftone image data at selected time delays which are predicted to be indicative of the image frequency characteristics, without prior thresholding. The arithmetic function used in that auto correlation system is an approximation of the auto correlation function using logical functions and addition, rather than the multiplication function used in U.S. Pat. No. 4,194,221 to Stoffel. Valleys in the resulting auto correlated function are detected to determine whether high frequency halftone image data is present.

U.S. patent application Ser. No. 08/004,479 by Shiau et al now U.S. Pat. No. 5,293,430 is directed to the particular problem noted in the use of the auto correlation function of the false characterization of a portion of the image as a halftone, when in fact it would be preferable for the image to be processed as a line image. Examples of this defect are noted particularly in the processing of Japanese Kanji characters and small Roman letters. In these examples, the auto correlation function may detect the image as halftones and process accordingly, instead of applying a common threshold through the character image. The described computations of auto correlation are one dimensional in nature, and this problem of false detection will occur whenever a fine pattern that is periodic in the scan line or fast scan direction is detected. In the same vein, shadow areas and highlight areas are often not detected as halftones, and are then processed with the application of a uniform threshold.

Great Britain Patent Publication No. 2,153,619A provides a similar determination of the type of image data. However in that case, a threshold is applied to the image data at a certain level, and subsequent to thresholding the number of transitions from light to dark within a small area is counted. The system operates on the presumption that data with a low number of transitions after thresholding is probably a high frequency halftone or continuous tone image. The thresholding step in this method has the same undesirable effect as described for Stoffel.

Of background interest in this area are U.S. Pat. No. 4,556,918 to Yamazaki et al. showing an arrangement assuming a periodicity of an area of halftone dots which are thresholded against an average value derived from the area to produce a density related video signal; U.S. Pat. No. 4,251,837 to Janeway, III which shows the use of a three decision mode selection for determining threshold selection based on gradient constants for each pixel; U.S. Pat. No. 4,578,714 to Sugiura et al. which shows random data added to the output signal to eliminate pseudo-outlines; U.S. Pat. No. 4,559,563 to Joiner, Jr. which suggests an adaptive prediction for compressing data based on a predictor which worked best for a previous pixel block; and U.S. Pat. No. 3,294,896 to Young, Jr. which teaches the usefulness of thresholding in producing an image from a binary digital transmission system; and U.S. Pat. No. 4,068,266 to Liao discloses a method for carrying out resolution conversion with minimum statistical error.

Also background of interest in this area are U.S. Pat. No. 4,509,195 to Nadler which describes a method for binarization of a pattern wherein two concentric rings around a pixel are evaluated to determine contrast values, and the contrast values are used then to determine whether the pixel and the surrounding areas have a light or dark quality, and U.S. Pat. No. 4,547,811 to Ochi et al. which teaches a method of processing gray level values, depending on the density level of blocks of pixels, and their difference from a minimum or maximum value. The blocks can then be processed by a halftone processing matrix depending on the difference value, U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

Although, significant work has been done in the automatic image segmentation area, with efforts, particularly characterized by U.S. patent application Ser. No. 08/004,479 by Shiau et al. now U.S. Pat. No. 5.293,430, to reduce the incorrect characterization of one image type as another, the problem continues to present difficulty. While image types can be characterized with a fair degree of particularity, the image content also has a tendency to impact the image. For example even using the improved methods of Shiau, some Kanji characters continue to be identified as halftones. Image quality issues are presented when the determination seemingly dithers between two image types. While this occasionally may be an accurate representation of the document intent, more commonly, it does not. Such artifacts, however, present significant problems for the ultimate user of the document.

U.S. patent application Ser. No. 08/076,651 by Williams discloses a method of reducing the occurrence of incorrect image type characterizations by additionally providing a morphological filtering operation, in conjunction with an image segmentation arrangement, which initially provides a noise removal filter operating on the image classification signal, to remove noise within an area of the image classification signal, and subsequently provides hole filling filter, which bridges small gaps in the image classification results. After consideration of document images as such, it has been noted that image classification could be considered a binary process similar to a color separation, i.e., detection is either ON or OFF. Using that model, for a single image type, classification defects can be characterized as either noise, defined as occasional image type detection in areas of predominantly non detection, or holes, defined as occasional non detection in areas of predominantly detection. Morphological filtering methods and apparatus, as described for example in U.S. Pat. No. 5,202,933 to Bloomberg, are used to coalesce areas which are primarily one state or the other. The method described by Williams aims to insure that detection and non-detection areas will remain contiguous areas, uncluttered by occasional false detections.

Additionally, U.S. patent application Ser. No. 08/076,072 by Robinson discloses a method of avoiding the misclassification of segments of images by an image segmentation arrangement by having users with a priori knowledge (such as an operator of a printing machine) provide as input to the segmentation arrangement the possible image types occurring in an original input document. This a priori knowledge (i.e. a set of image types that have been pre-determined by a user) is used to automatically eliminate classification types available to the image segmentation arrangement, thereby eliminating possible misclassifications by the segmentation arrangement. The embodiment described by Robinson redirects incorrectly classified image types to the set of image types provided by the user.

Figure 5:
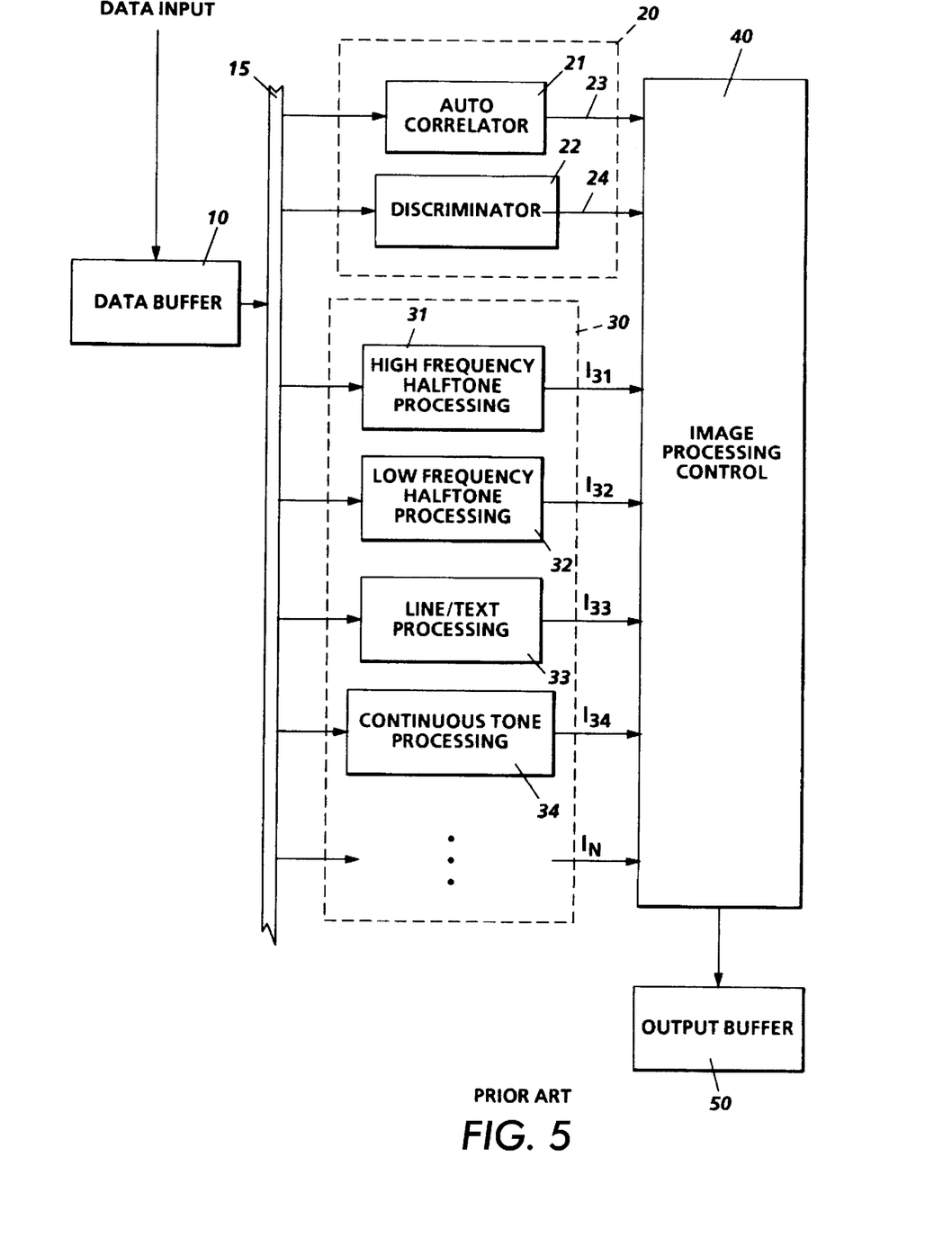
FIG. 5 shows a block diagram of a prior art image processing system.

FIG. 5 shows the basic automatic segmentation system originally conceived by Stoffel and improved by Lin, Shiaw, Williams and Robinson as described hereinbefore. The basic system shown in FIG. 5 is made up of three modules. Input information stored in data buffer 10 is simultaneously directed to an image property classifying section 20, the first module, and an image processing section 30, the second module. The image property classifying section 20, made up of any number of sub-modules (e.g. auto correlator 21 and discriminator 22), determines whether a block of image pixels (picture elements) stored in data buffer 10 is of one type of imagery or another (e.g. halftone, line/text and continuous tone). In parallel with the image property classifying section 20, the image processing section 30, made up of any number of sub-processing sections (e.g. high frequency halftone processor 31, low frequency halftone processor 32, line/text processor 33 and continuous tone processor 34), performs image processing operations on the same block of image pixels as section 20. Each image sub-processing section performs image processing operations that are adapted to improve the image quality of a distinct class of imagery. The third module, control section 40, uses the information derived by the image classifying section 20 to control the image processing section 30.

Figure 6:
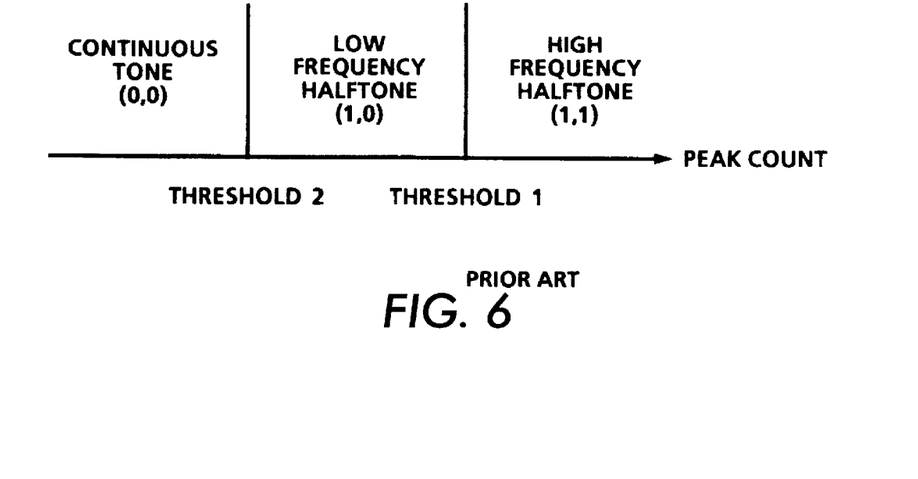
FIG. 6 shows the thresholding technique used by the prior art to determine an appropriate image processing technique for images having different image types.

The decision as to what class of imagery a block of image pixels belongs is typically binary in nature (e.g. either a yes or a no). For example, in a conventional image segmentation scheme image property classifying section 20 classifies each pixel as one of three classes of imagery (e.g. high frequency halftone, low frequency halftone and continuous tone), and depending on the classification, each pixel is processed according to the properties of that class of imagery (e.g. either low pass filtered and rescreened if it is a high frequency halftone, thresholded with a random threshold if it is a low frequency halftone or edge enhance and screened if it is a continuous tone). Also, assuming that the decision as to which of the three classes of imagery a pixel belongs is based on a single image property, the peak count of the input image data, the resulting image classification decision of the peak count image property is made by thresholding the peak count into three classes of imagery as shown in FIG. 6. Consequently, control section 40 decides the type of image processing a block of image pixels requires depending on the decision made by classification section 20 that selected between the three possible classes of imagery using thresholds 1 and 2. Thus the output of classification section 20 is quantized to one of three possibilities, control section 40 selects output from one of three image sub-processing sections.

Figure 3:
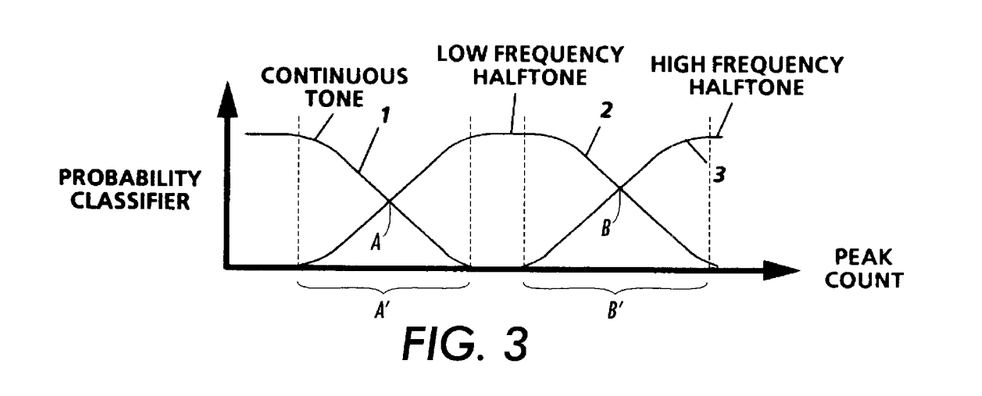
FIG. 3 shows an example of a characteristic function of the image property peak count.

Image classification decisions using thresholds are usually artificially abrupt since an image can change from one class of imagery to another slowly and gradually. This abrupt decision making, which produces a forced choice among several distinct alternative choices, is a primary reason for the formation of visible artifacts in the resulting output image. Most transition points or thresholds (e.g., THRESHOLD 1 or THRESHOLD 2 in FIG. 6, and A or B in FIG. 3) are selected so that an image can be classified as one class of imagery with a high degree of certainty, however those classes of imagery that can not be classified with such certainty have multiple transition points or a transition zone. Using only one point (e.g. a threshold) to define a transition zone results in the formation of visible artifacts in the resulting output image. Although, it is possible to make the transition zone narrower so that there is less chance that an image falls into the zone, there exists a limit on how narrow the zone can be made.

Figure 7:
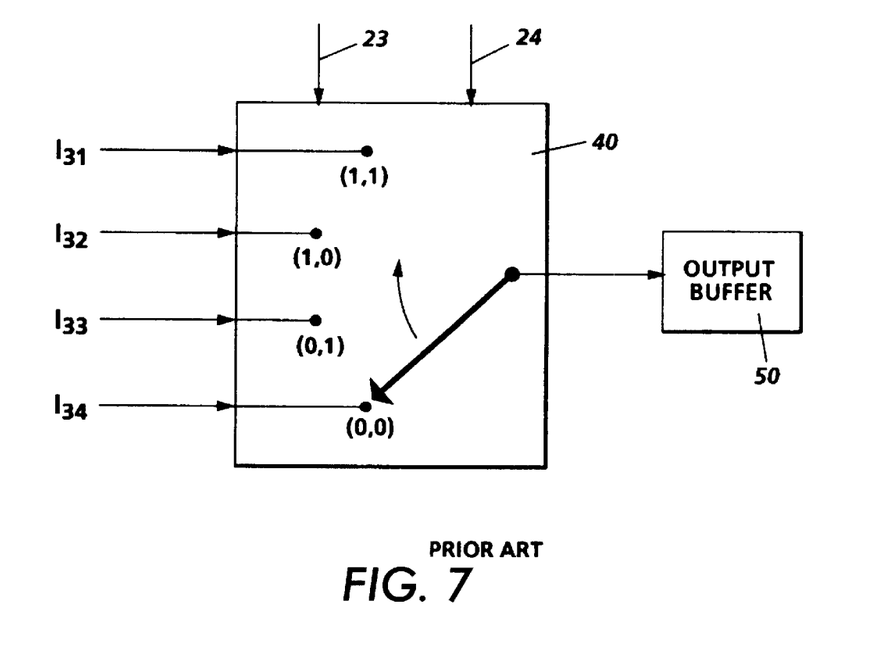
FIG. 7 shows a detail block diagram of the prior art image processing control circuit shown in FIG. 5.

In general, the prior art describes control section 40 essentially as a switch, as shown in FIG. 7, since the image processing steps performed for each class of imagery are different depending on the classification given to each block of input image pixels. The switch or multiplexer allows data residing at the output of image processor 30, $I_{31}$, $I_{32}$, $I_{33}$ and $I_{34}$ to be directed to output buffer 50 depending on the decisions made by imagery classifying section 20, which are output on lines 23 and 24. This type of binary decision making is rigid and results in image segmentation decisions that do not fail gracefully and consequently form visible artifacts in the output image stored in buffer 50. There exists therefore a need for an improved image processing system that fails more gracefully when incorrect segmentation decisions are made. By failing more gracefully, the system minimizes the formation and therefore the visibility of artifacts in the resulting output image.

All references cited in this specification, and their references, are incorporated by reference herein where appropriate for appropriate teachings of additional or alternative details, features, and/or technical background.

SUMMARY OF THE INVENTION

In accordance with the invention there is provided a digital image processing system for automatically segmenting a set of input image signals into a combination of predetermined classes of imagery, the set of input image signals forming part of a video image generated by an image input terminal. The system includes a classification circuit for receiving the set of input image signals and for classifying the set of input image signals as a ratio of the predetermined classes of imagery. In combination, a plurality of image processing circuits receive the set of input image signals, each of which is adapted to process a unique class of imagery selected from the predetermined classes of imagery to generate a set of output image signals for that predetermined class of imagery., Finally, a mixing circuit combines each of the sets of output image signals determined by the plurality of image processing circuits in accordance with the ratio determined by the classification circuit to form a single set of output image signals.

In accordance with another aspect of the invention there is provides a method for automatically segmenting a set of input image signals into a combination of predetermined classes of imagery, the set of input image signals forming part of a video image generated by an image input terminal. The method includes the steps of classifying the set of input image signals as a ratio of the predetermined classes of imagery, processing the set of input image signals with a plurality of image processing circuits uniquely adapted for processing a single predetermined class of imagery to provide a plurality of sets of output image signals corresponding to each predetermined class of imagery, and combining the plurality of sets of output image signals in accordance with the ratio determined by the classifying step to form a single set of output image signals.

BRIEF DESCRIPTION OF THE DRAWINGS

These and other aspects of the invention will become apparent from the following descriptions, illustrating a preferred embodiment of the invention, read in conjunction with the accompanying drawings wherein the same reference numerals have been applied to like parts and in which.

DETAILED DESCRIPTION

In the description herein "image data" or "pixels" in the form of video image signals, which may be either analog or digital voltage representations of an image, is provided from a suitable source. For example, the image signals may be obtained through line by line scanning of an image bearing original by one or more photosensitive elements, such as a multiple photosite array of charge coupled devices, commonly referred to as CCD's. Line by line scanning of an image bearing original for the derivation of image data is well known and does not form a part of the present invention. Image data may also be derived by a computer workstation programmed in accordance with document creation application software, or from a data storage device.

In content, the original video image signals may be composed entirely of a single image component such as lines, text, low frequency halftones, high frequency halftones, continuous tones, or combinations thereof. Each image components is "an image type" or "a class of imagery", which are further defined in the references cited herein. Preferably, each class of imagery is processed using a method that is optimally suited for reproducing the original video image data on image output terminals having limited resolution and depth such as a printer or a display. In general, an image input terminal, such as a scanner, generates image information having greater depth (e.g. 256 levels of gray) than is reproducible by an image output terminal such as a printer having lesser depth (e.g. 2 levels, black or white). These processing methods in which each class of imagery is optimally processed for reproduction on a limited resolution output device are defined herein as "image processing units" or "image processing circuits". In contrast, "an image classifier" segments groups of image pixels into different classes of imagery for optimal processing by each respective processing unit.

Figure 1:
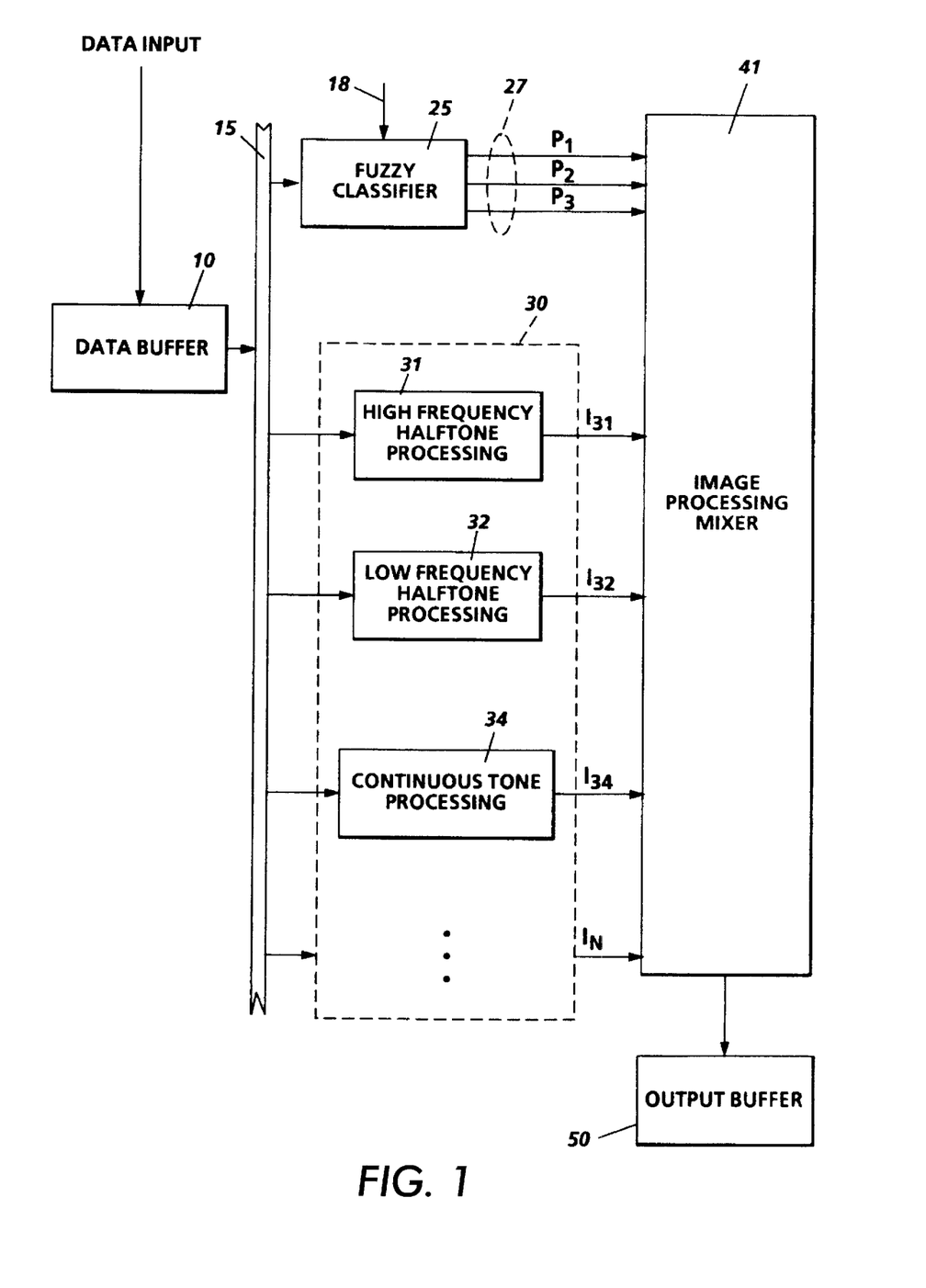
FIG. 1 illustrates a block diagram of an image processing system incorporating the present invention.

With reference now to the drawings where the showings are for the purpose of illustrating a preferred embodiment of the invention and not for limiting same, FIG. 1 shows a block diagram of an image processing system incorporating the present invention. The system can receive input image data derived from any number of sources, including a raster input scanner, a graphics workstation, an electronic memory or other storage element, etc. In general, the image processing system shown in FIG. 1 includes fuzzy classifier 25, image processing section 30 and image processing control mixer 41. Input image data is made available to the image processing system along data bus 15, which is subsequently processed in parallel by fuzzy classifier 25 and image processing section 30. Fuzzy classifier 25 classifies the image data as a ratio or proportion of a number of predetermined classes of imagery. The ratio is defined by a set of probability values that predict the likelihood the image data is made up of a predetermined number of classes of imagery. The probabilities 27, one for each predetermined class of imagery, are input to image processing mixer or control unit 41 along with image output data from image processing section 30. Image processing section 30 includes units 31, 32 and 34 that generate output data from the image data in accordance with methods unique to each predetermined class of imagery. Subsequently, mixer 41 combines a percentage of each class of output image data from units 31, 32 and 34, according to the ratio of the probabilities 27 determined by classifier 25. The resulting output image data from mixer 41 is stored in output buffer 50 before subsequent transmission to an image output terminal such as a printer or display.

Initially, the stream of image pixels from an image input terminal is fed to data buffer 10. Buffer 10, which comprises any suitable commercially available serial in/serial out multi-row buffer having a bit storage capacity sufficient to temporarily store lines of image pixels, permits processing of image data in blocks of several lines. The image data stored in data buffer 10 is in its raw gray format, for example, 6–8 bits per pixel. A suitable block size is 16 pixels at 400 spots/inch, or 12 pixels at 300 spots/inch. Too large a sample size has a tendency to cause a blurred result, while too small a sample size does not contain a sufficient amount of data for a good sample. In either case the sample size affects the accuracy of fuzzy classifier 25.

Figure 2:
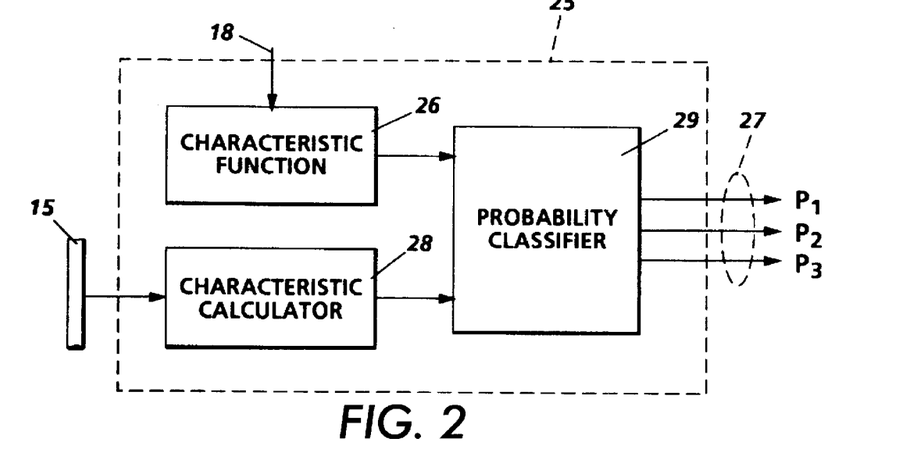
FIG. 2 shows a detail block diagram of the fuzzy classifier shown in FIG. 1.

With reference now to FIG. 2, where fuzzy classifier 25 is shown in detail. The block of image pixels stored in buffer 10 is transmitted to characteristic calculator 28 through data bus 15. Calculator 28 provides an output value that characterizes a property of the image data transmitted from buffer 10, such as its peak count. In one embodiment, a characteristic value is determined by calculator 28 that represents the peak count of the block of image data. The peak count is determined by counting those pixels whose values are the nontrivial local area maximum or minimum in the block of image data. First local area maximum or minimum pixel values are selected depending on whether the average value of all the pixels in the block of image data is higher or lower than the median value of the number of levels of each pixel (e.g. the average value is higher or lower than 128 out of 0–255 levels). The following discussion assumes that the average value of the block of pixel is higher than the median pixel value and therefore nontrivial local area maximum pixel values are determined from local area maximum pixel values. A local area maximum is established by checking if each pixel is larger than its surrounding pixels or neighbors. More specifically, each pixel $V_{i,j}$, where the index i refers to scanlines, and the index j refers to pixels in a scan line, is compared with a preselected group of neighbors, in this case 8 adjacent pixels, and their average value $Avg_{i,j}$. Pixel $V_{i,j}$ is determined to be a maximum if the gray level value of the pixel is greater than all 8 of the neighboring bits. In a preferred arrangement, to be declared a nontrivial maximum, pixel $V_{i,j}$ must also be greater than the neighborhood average by a predefined noise margin. In the described example, the noise margin is 8 levels, out of 0–255 levels. Alternate arrangements accomplishing image characteristic classification are described in U.S. patent application Ser. No. 08/004,479 by Shiau et al. (U.S. Pat. No. 5,293,430) (published at EP-A2 0 521 662 on Jan. 7, 1993).

After calculator 28 evaluates the peak count of the image data, probability classifier 29 determines three probability values 27 (i.e. $P_1$, $P_2$ and $P_3$) that correspond to each image type associated with the peak count as expressed by a characteristic function or equation witch is stored in memory 26. The characteristic function, determined with a priori image data, represents a plurality of probability distributions that are determined using a population of images. Each probability distribution depicts the probability that a block of image data is a certain image type given the occurrence of an image property (e.g. peak count). For example the characteristic function stored in memory 26 can be represented by the graph shown in FIG. 3, which relates the probability distributions for continuous tone 1, low frequency halftone 2 and high frequency halftone 3 to the occurrence of particular image characteristic, which in this example is the peak count. The characteristic function shown in FIG. 3 therefore assigns a high probability for high frequency halftones when the peak count is high, decreasing in probability as the peak count diminishes. A series of probabilities are also assigned for continuous tone and low frequency halftones depending on different peak count values. Additionally, the characteristic function stored in memory 26 can be adjusted using input control 18. Using control 18 the resulting output image stored in buffer 50 can be altered by modifying the characteristic function representing the different classes of imagery evaluated by image processing system 30.

Subsequently, probability classifier 29 determines each probability value $P_1$, $P_2$ and $P_3$ by evaluating the probability distribution of each image type represented by the characteristic function stored in memory 26. For example, a peak count of 50 could result in probability values equal to 0.2, 0.8 and 0.0 which correspond to probability values $P_1$, $P_2$ and $P_3$ or a ratio of 1:4:0, respectively. In this example, the block of image data, determined by calculator 28 to have a peak count equal to 50, is most likely to be made up of low frequency halftone data (e.g. 80% likely) and less likely to be made up of continuous tone (e.g. 20% likely) and high frequency halftones (e.g. 0% likely). After determining probability values $P_1$, $P_2$ and $P_3$, classifier 29 outputs these results to image processing mixer or control 41.

With reference again to FIG. 1, image processing section 30 operates concurrently with fuzzy classifier 25 on image data stored in buffer 10 and transmitted through data bus 15. Image processing section 30 includes high frequency halftone processing unit 31, low frequency halftone processing unit 32 and continuous tone processing unit 34. Each processing unit processes all image data in accordance with a particular image type. For example, high frequency halftone processing unit 31 first low pass filters and then adds a screen function, low frequency halftone processing unit 32 adds a controlled amount of random noise and continuous tone processing unit 34 edge enhances and adds a screen function to image data. Each of the processing units 31, 32 and 34 generates output blocks $I_{31}$, $I_{32}$ and $I_{34}$ of unquantized video data respectively.

Figure 4:
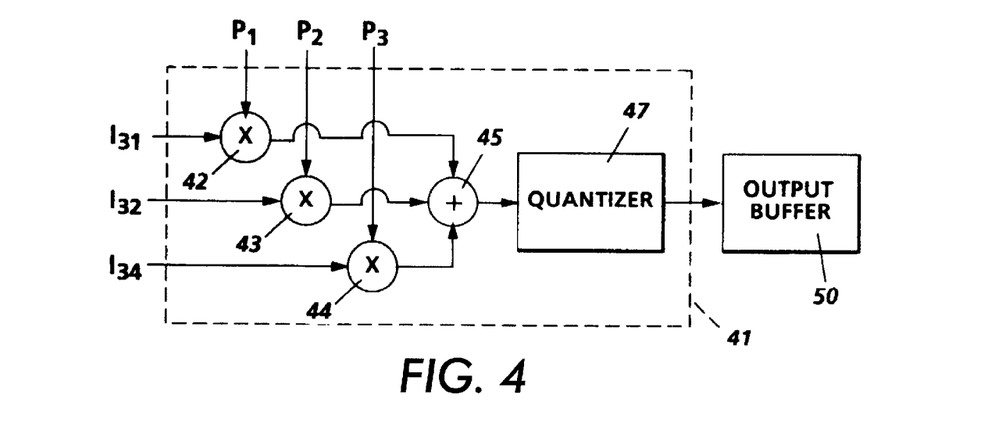
FIG. 4 shows a detail block diagram of the image processing mixer shown in FIG. 1.

Image processing control 41 mixes data output blocks $I_{31}$, $I_{32}$ and $I_{34}$ output derived by image processing units 31, 32 and 34 respectively, to form a composite block of output image signals that is stored in output buffer 50. The manner in which output blocks $I_{31}$, $I_{32}$ and $I_{34}$ are mixed is characterized by a ratio defined the probabilities determined by fuzzy classifier 25. FIG. 4 show image processing mixer 41 in detail. Mixer 41 multiplies output blocks $I_{31}$, $I_{32}$ and $I_{34}$ output from image processing section 30 with probability values $P_1$, $P_2$ and $P_3$ output from fuzzy classifier 25 using multipliers 42, 43 and 44 respectively. The resulting output from multipliers 42, 43 and 44 is representative of a percentage or ratio of each output block $I_{31}$, $I_{32}$ and $I_{34}$ respectively, the sum of which defines a composite block of output image signals. The composite block of output image signals is formed by adding the output of multipliers 42, 43 and 44 using adder 45, and by subsequently quantizing the sum of adder 45 using quantizer 47. The resulting image block output by quantizer 47 is stored in output buffer 50 before subsequent transmission for output to an image output terminal having limited resolution or depth (e.g. a binary printer).

It will no doubt be appreciated that there are a number of different image properties (besides peak count) that can be related over a range of values using the characteristic function stored in memory 26, and that these different characteristic functions can be combined to define an unlimited number of different classes of imagery. Some examples of image properties that can be used besides peak count are autocorrelation functions, edge signal strength, mean and standard deviations. What is required by the present invention, however, is that the characteristic function of an image property provide a transition zone between different classes of imagery (e.g., A' or B' in FIG. 3), add that the transition zone be large enough so that gradual shifts between different classes of imagery are accounted for. The present invention therefore resists the tendency to classify image segments into neat mutually exclusive classes by, for example, thresholding. Accordingly, the present invention first determines a value for an image property, such as the peak count, for a block of image signals. A characteristic function, developed using a priori knowledge of a population of image signals that relates the image property over a range of values to a plurality of image classes, is evaluated using the value of the image property determined for the block of image signals to determine a set of probability values. The set of probability values defines a ratio with which the block of image signals is classified for each class of imagery. The ratio is used to mix output image signals provided by image processing units uniquely adapted to process each predetermined class of imagery. The probability values, therefore, provide a transition zone between different classes of imagery, thereby reducing the formation of artifacts in the resulting mixed output image.

The disclosed image processing system may be readily implemented in software using object oriented software development environments that provide portable source code that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A digital image processing system for automatically classifying a set of input image signals into a combination of at least three predetermined classes of imagery and producing output image signals in accordance with the classes, the set of input image signals forming part of a video image generated by an image input terminal, comprising:

a mixing circuit;

a data buffer for receiving the set of input image signals;

a classification circuit for characterizing properties of each of the input signals, said classification circuit producing, as a function of the properties of each of the input image signals, a plurality of non-zero probability values, each non-zero probability value representing a likelihood that one of the input image signals of the set of input image signals is a member of a respective one of the at least three predetermined classes of imagery, and transmitting probability signals indicative thereof to said mixing circuit; and a plurality of image processing circuits receiving the set of input image signals from the data buffer, each of said plurality of image processing circuits being adapted to process the input image signals in accordance with a process identified for one of the at least three predetermined classes of imagery, said mixing circuit combining the signals from at least two of said plurality of image processing circuits in accordance with the probability signals received from said classification circuit to form a single set of output image signals, wherein a subset of the output image signals, representing input image signals from a transition zone where there is no high degree of certainty associated with any of the predetermined classes of imagery, comprise signals processed by the at least two of said plurality of image processing circuits so as to account for gradual shifts between regions of the input image representing the different classes of imagery.

2. The system as described claim 1, wherein said classification circuit comprises:

a memory;

a characteristic equation stored in said memory, said characteristic equation being derived from a population of video images that represent an image property having a relationship with the predetermined classes of imagery;

a characteristic calculator adapted to calculate a characteristic value for the set of input image signals of the image property represented by said characteristic equation; and a probability classifier for evaluating said characteristic equation using the characteristic value calculated by said characteristic calculator to determine a probability value for each of the predetermined classes of imagery.

3. The system as described in claim 2, wherein said classification circuit comprises an input control for adjusting said characteristic equation.

4. The system as described in claim 2, wherein the image property described by said characteristic equation is determined from a peak count of the input image signals.

5. The system as described in claim 2, wherein said characteristic equation defines a unique probability distribution for each predetermined class of imagery.

6. The system described in claim 2, wherein said mixing circuit comprises:

a plurality of multiplier circuits; and an adder circuit, coupled to said plurality of multiplier circuits, for providing a single set of unquantized output image signals.

7. The system described in claim 6, wherein said mixing circuit comprises a quantization circuit, coupled to said adder circuit, for quantizing said single set of unquantized output image signals.

8. The system as described in claim 1, wherein the predetermined classes of imagery include low frequency halftones, high frequency halftones and continuous tones.

9. The system as described in claim 1, further comprising an image output terminal for receiving the single set of output image signals.

10. The system as described in claim 9, wherein said image output terminal is a printer.

11. The system as described in claim 9, wherein the image input terminal is a scanner.

12. The system as described in claim 1, further comprising a memory for receiving and storing the input image signals.

13. A method for automatically classifying a set of input image signals into combinations of at least three predetermined image classes, the set of input image signals forming part of a video image generated by an image input terminal, comprising:

classifying the input image signals by image type, including identifying properties of each input image signal within the set;

determining from the identified properties for each input image signal the likelihood of each input image signal being a member of one of the at least three predetermined image classes;

producing a plurality of non-zero probability values for each input image signal, each non-zero probability value representing the likelihood that the input image signal is a member of a respective one of the at least three predetermined image classes;

operating on the set of input image signals with a plurality of image processing circuits, each of the image processing circuits being uniquely adapted for processing the input image signals in accordance with a process associated with a single predetermined image class, to provide a plurality of sets of output image signals wherein each set corresponds to classes; and combining output image signals from the plurality of sets of output image signals, in accordance with the non-zero probability values associated with each of the input image signals, to form a single set of output image signals, wherein input image signals in a transition zone found between different classes of imagery within the video image are combined to effect a shift in processing methods so as to reduce the appearance of any artifacts at corresponding transition zones in the output image.

14. The method according to claim 13, wherein said classifying step comprises the steps of:

deriving a characteristic equation from a population of video images, the characteristic equation relating an image property of the population of video images with the predetermined image classes;

calculating a characteristic value for the set of input image signals, the characteristic value representing the image property represented by the characteristic equation; and evaluating the characteristic equation using the characteristic value to determine a probability value for each of the predetermined image classes.

15. The method according to claim 14, wherein said classifying step comprises the step of adjusting the characteristic equation.

16. The method according to claim 14, wherein said classifying step comprises the step of providing the characteristic equation with a unique probability distribution for each predetermined image class.

17. The method according to claim 14, wherein said classifying step classifies the image property described by the characteristic equation determined by the peak count of the input image signals.

18. The method according to claim 13, wherein the processing step processes the predetermined classes of imagery in accordance with image processing circuits adapted for processing low frequency halftones, high frequency halftones and continuous tones.

19. The method according to claim 13, wherein said combining step comprises the steps of:

multiplying each sets of output image signals with a fraction defined by the probability of each of the predetermined classes of imagery; and adding the products of said multiplying step to provide an unquantized single set of output image signals.

20. The method according to claim 19, wherein said combining step comprises the step of quantizing the unquantized single set of output image signals.

21. The method according to claim 13, further comprising the step of transmitting the single set of output image signals to an image output terminal for reproduction.

22. The method according to claim 13, wherein said transmitting step transmits the single set of output image signals to a printer.

23. The method according to claim 13, further comprising the step of scanning a document with an image scanner to generate input image signals.

24. The method according to claim 13, further comprising the step of storing the set of input image signals provided by the image input terminal in a memory.

* * * * *